United States Patent [19]

Itoh

[11] Patent Number: 5,097,500

[45] Date of Patent: Mar. 17, 1992

[54] RADIO TELEPHONE SYSTEM WHICH WRITES AN IDENTIFICATION CODE VIA RADIO LINK WHEN UNITS ARE ELECTRICALLY CONNECTED

[75] Inventor: Koichi Itoh, Hino, Japan

[73] Assignee: Kabushiki Kaisha Toshiba, Kawasaki, Japan

[21] Appl. No.: 340,091

[22] PCT Filed: May 13, 1988

[86] PCT No.: PCT/JP88/00461

§ 371 Date: Jan. 13, 1989

§ 102(e) Date: Jan. 13, 1989

[87] PCT Pub. No.: WO88/09095

PCT Pub. Date: Nov. 17, 1988

[30] Foreign Application Priority Data

May 15, 1987 [JP] Japan .................. 62-116926

[51] Int. Cl.⁵ .................................... H04M 11/00
[52] U.S. Cl. .................................... 379/62; 379/63; 455/54
[58] Field of Search ........... 379/58, 61, 62, 63; 465/54

[56] References Cited

U.S. PATENT DOCUMENTS

| | | | |
|---|---|---|---|
| 4,535,200 | 8/1985 | Himmelbauer et al. | 379/62 |
| 4,593,155 | 6/1986 | Hawkins . | |
| 4,639,549 | 1/1987 | Hirayama et al. | 379/62 |
| 4,639,550 | 1/1987 | Yamagawa et al. | 379/62 |
| 4,650,928 | 3/1987 | Numata | 379/62 |
| 4,682,351 | 6/1987 | Makino | 379/62 |
| 4,706,274 | 11/1987 | Baker et al. | 379/62 |
| 4,748,655 | 5/1988 | Thrower et al. | 379/58 |
| 4,776,001 | 10/1988 | Murata et al. | 379/62 |
| 4,794,636 | 12/1988 | Sanglier et al. | 379/62 |

FOREIGN PATENT DOCUMENTS

| | | |
|---|---|---|
| 0148458 | 7/1985 | European Pat. Off. . |
| 61-41234 | 2/1986 | Japan . |
| 0070824 | 4/1986 | Japan ............ 379/62 |
| 62-26937 | 2/1987 | Japan . |
| WO85/02738 | 6/1985 | World Int. Prop. O. . |

OTHER PUBLICATIONS

Patent Abstracts of Japan, vol. 9, No. 270, Japanese Application, No. 60-114044, Oct. 26, 1985.

*Primary Examiner*—Thomas W. Brown
*Assistant Examiner*—Dwayne D. Bost
*Attorney, Agent, or Firm*—Finnegan, Henderson, Farabow, Garrett, and Dunner

[57] ABSTRACT

A radio telephone system which comprises a base unit (1) connected to a wire line (3) and at least one radio telephone set (2) to be coupled with the base unit (1) through a radio circuit, and in which coupling between the base unit and the radio telephone set is controlled on the basis of an identification code. A non-volatile first memory (58) having an identification previously written therein is provided in one of the base unit (1) and the radio telephone set (2), and an optionally writable second memory (60) is provided in the other. Written in the second memory (60) is a predetermined identification code on the basis of the identification code stored in the first memory (58).

2 Claims, 12 Drawing Sheets

RADIO TELEPHONE SYSTEM WHICH WRITES AN IDENTIFICATION CODE VIA RADIO LINK WHEN UNITS ARE ELECTRICALLY CONNECTED

TECHNICAL FIELD

The present invention relates to radio telephone systems and, more particularly, to a radio telephone system which allows the easy modification of identification code (ID code).

BACKGROUND ART

A prior art system of the type referred to is arranged as shown in FIG. 11.

A base unit 1, which is coupled through a radio communication circuit to a wireless set 2, is also connected to a wire telephone line 3.

The outline of the operation of the base unit 1 will be explained in the following.

A signal transmitted from the wire telephone line 3 is applied through a line relay 33 and a hybrid circuit 4 to a transmitter 5 to be modulated thereat and to obtain modulated radio waves. The modulated radio waves are sent through an antenna duplexer 6 to an antenna 7 to be transmitted from the antenna to the radio telephone set 2.

Radio waves transmitted from the radio telephone set 2, on the other hand, are received at the antenna 7 and then sent through the antenna duplexer 6 to a receiver 8 to be demodulated therein and to obtain a demodulated signal. The demodulated signal is sent onto the wire telephone line 3 through the hybrid circuit 4 and the line relay 33.

A synthesizer 9 outputs a frequency corresponding to a radio channel to the transmitter 5 and the receiver 8.

One output of the receiver 8 is applied to a received-electric-field detecting circuit 10 to determine the intensity of the received electric field. This circuit 10 is usually called a carrier squelch circuit or a noise squelch circuit.

The other output of the receiver 8 is output as a data signal included in the received demodulated waves, that is, it is applied to an identification signal detecting circuit 11 to be compared with an identification signal that is determined by a combination of the base unit 1 and the radio telephone set 2. This identification signal is generally called an ID code.

An output of the detection circuit 11 and the demodulated output of the data signal of the receiver 8 are input to a control circuit 12 to be used for control of interconnection. The control circuit 12 in turn controls the synthesizer 9 for control of the radio channel, and also controls to cause the supply of a transmission data signal to the transmitter as a modulation input.

Similarly to the base unit 1, the radio telephone set 2 also has an antenna 13, an antenna duplexer 18 and a receiver 14, in which a demodulated output of the receiver 14 is sent to a telephone receiver 15. A voice input signal from a telephone transmitter 16 is applied to a transmitter 17 to be modulated and then sent through the antenna duplexer 18 to the antenna 13, from which the voice signal is radiated in the form of radio waves.

A synthesizer 19, a received-electric-field detecting circuit 20 and an identification signal detecting circuit 21 are the same as those in the base unit 1, and a control circuit 22 performs control over the radio telephone set 2. A loudspeaker 23 is a sounder which emits a calling voice indicative of a receiving call.

With respect to the power of these circuits, the base unit 1 is connected through an AC plug 24 to a commercial AC 100V plug receptacle so that outputs of a rectifier and stabilizer circuit 25 are distributed to the respective circuits of the base unit. One of the outputs of the circuit 25 is also supplied through a current control resistor 26, charging terminals 27 and 28 to a chargeable battery 29 to use the output of the battery 29 as the power of the radio telephone set 2.

The control of the above prior art example in a signal reception mode will be schematically shown in FIG. 12.

More specifically, when the base unit 1 detects a ringing signal from the wire telephone line 3 at a ringing-signal detector 30 in an await mode (step 34), the unit 1 sets the synthesizer 9 for the control channel and turns ON the transmitter 5 to transmit the received signal (step 35). The received signal includes a signal specifying a speech channel (S-CH).

The radio telephone set 2, on the other hand, turns ON the synthesizer 19 for a period of a predetermined time t1 in an await mode to set the synthesizer for the control channel and also turns ON the transmitter 14 (step 36). Under such a condition, if the radio telephone set 2 receives the received signal (step 37), then it turns ON the transmitter 17 (step 38), transmits an answer signal including the ID code in response to the receive signal (step 39), and switches the speech channel (S-CH) to the specified one (step 45). When the radio telephone set 2 receives no receive signal, it turns OFF the synthesizer 19 and the receiver 14 for a period of a predetermined time t2 (step 40). The intermittent signal reception of the receiver 14 based on its ON and OFF operations is called battery saving.

More in detail, assuming that the receiver 14 in its OFF state consumes a current I OFF and the receiver 14 in its ON states consumes a current I ON, then an average consumption current IA in the await mode of the radio telephone set 2 is expressed as follows.

$$IA = (t1 \times I\ ON + t2 \times I\ OFF)/(t1 + t2)$$

Since a relation of I ON >> I OFF is usually satisfied, the average consumption current IA can be made small.

The base unit 1, when detecting radio waves transmitted from the radio telephone set 2 at the received-electric-field detector 10 (step 41), stops the transmission of the received signal (step 42). At this stage, if the field detector 10 detects no radio waves, then the base unit 1 continually transmits the received signal up to a predetermined number of times n (step 43). The predetermined-time transmission is due to the intermittent reception of the radio telephone set 2. That is, the radio telephone set 2 cannot receive the transmitted signal for a time period of t2, and thus the transmission is carried out preferably for a period of a time longer than the time t2 by an amount corresponding to 2 received signals. The abortion of the transmission up to n times is due to the avoidance of the useless occupation of the control channel in the event where the radio telephone set 2 is powered off or located a long distance from the base unit 1.

Next, when the ID code included in the received-signal answer signal from the radio telephone set 2 coincides with the ID code set for the base unit 1 (step 44), the base unit 1 switches the speech channel S-CH to the one specified by the received signal. If the two ID codes do not coincide, then the received answer signal is the one from another radio telephone set and thus the base unit waits until the ringing from the wire telephone line 3 is terminated (step 47) and returns to its away state.

After switching to the speech channel, the base unit 1 transmits a bell ringing signal (step 47). The radio telephone set 2, when receiving the bell ringing signal (step 48), controls the sounder 23 to generate a calling sound (step 49). Under this condition, an off-hook operation of the radio telephone st 2 (step 50) causes the telephone set 2 to transmit an off-hook signal (step 51), thus putting the telephone set in its speech mode (step 55).

On the other hand, the base unit 1, when receiving the off-hook signal (step 52), stops the transmission of the bell ringing signal (step 53), and closes the line relay 33 to establish a speech loop with the wire telephone line 3 and enter its speech mode (step 54).

When the number of transmission times at the transmitter reaches n, the base unit detects the termination of the signal reception (step 56) and returns to its await mode, thereby preventing the unnecessary signal-reception re-operation.

In this way, it is ensured to establish a radio telephone set loop only with a party having a coincided ID code, thereby preventing any erroneous interconnection and telephone charges resulting from radio interference. The respective ID codes are previously written in associated ID ROM's 58 and 59, and the ID ROM's are both of an electrically non-volatile type to avoid the extinguishment of such ID codes even in case of a power failure.

Such a system as mentioned above has had a problem that since the base unit 1 and the radio telephone set 2 have respectively ID codes fixedly written in the associated ID ROM's, when it is desired to modify the combination therebetween or add a new combination, it is necessary to open the respective casings of the unit 1 and telephone set 2 and to exchange the previously written ID ROM's or add new ones. For example, when it is desired to use a plurality of radio telephone sets with respect to the single base unit 1 or to move a radio telephone set to another place and to establish a radio circuit between the telephone and another base unit, it has been impossible for the prior art system to realize it.

In view of such circumstances, it is an object of the present invention to provide a radio telephone system which eliminates the above problem in the prior art and which allows the easy addition and modification of combinations between radio telephone sets and base units.

DISCLOSURE OF INVENTION

In accordance with the present invention, an ID ROM is provided in either one of a base unit or a radio telephone set and a means for writing the ID code of the base unit is provided in the radio telephone set. Alternatively, the means for writing the ID code of the radio telephone set may be provided in the base unit.

Since the ID code fixedly attached to the base unit or radio telephone set can be written in the party side according to the present invention, the improvement of the system including the arbitrary combination change and the addition of the radio telephone sets can be realized.

BEST MODE FOR CARRYING OUT THE INVENTION

Figure 1:
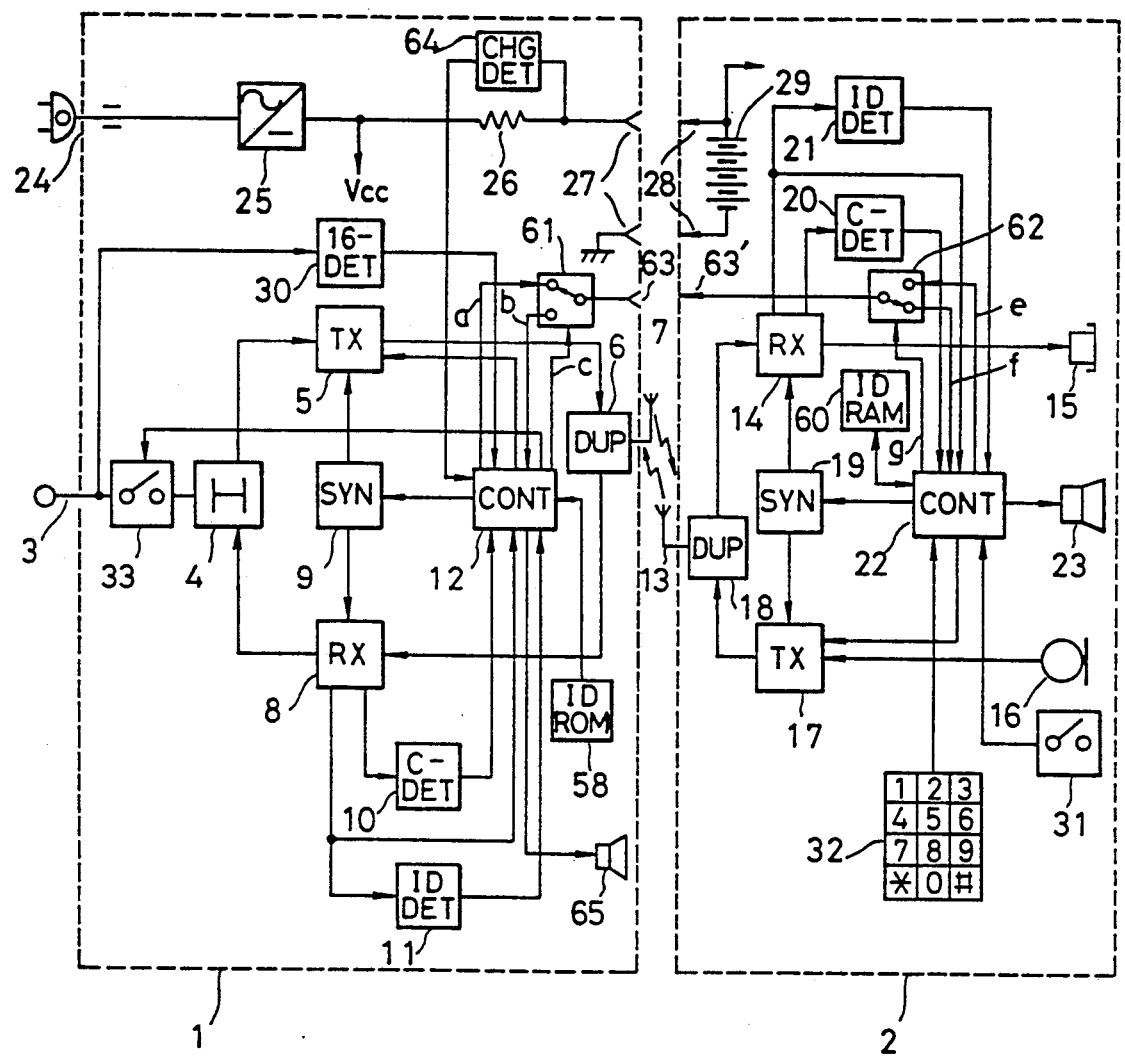
FIGS. 1, 2, 3, 4, 6, 8 and 9 are block diagrams showing different embodiments of the present invention, respectively.

Referring to FIG. 1, there is shown a first embodiment of the present invention, in which the ID ROM 58 is a non-volatile memory. When the radio telephone set 2 is connected to the base unit 1 to charge the battery 29, a charging current flows through the charging terminals 27 and 28. This causes a voltage at one end of the resistor 26 located on the side of the terminal 27 to drop from Vcc (for example 8V) to the voltage of the battery 29 (for example, 4V). When a charge detecting circuit 64 detects such a voltage drop, the base unit detects the interconnection with the radio telephone st. The control 12 then sends the contents or ID code of the ID ROM 58 to the control circuit 22 of the telephone set 2 through the route of a signal line a, a switch circuit 61, ID code write terminals 63 and 63', a switch circuit 62 and a signal line f. The control circuit 22 in turn writes the received ID code of the ID ROM 58 into an ID-code writing RAM 60 and subsequently executes such control as earlier mentioned based on the ID code.

After the ID code has been written in the RAM 60, the switch circuits 61 and 62 are switched under control of signals on line c and g as connected to their positions opposite to those in FIG. 1, so that the written ID code is sent through the route of a signal line e, the switch circuit 62, the ID code write terminals 63' and 63, the switch 61 and a signal line b to the control circuit 12 to be compared with the contents of the ID ROM 58. As a result, it can be reliably checked whether or not an improper contact between the terminals 63 and 63' or the like has lead to a failure in the correct writing of the ID code, and thus the radio circuit control can thereafter be carried out with a sufficiently high reliability.

When the base unit 1 finds a non-coincidence beween the ID codes as a result of the comparison or receives no ID code, a sounder 65 provided in the base unit 1 may issue an alarm sound or other proper indication may be provided.

Figure 2:
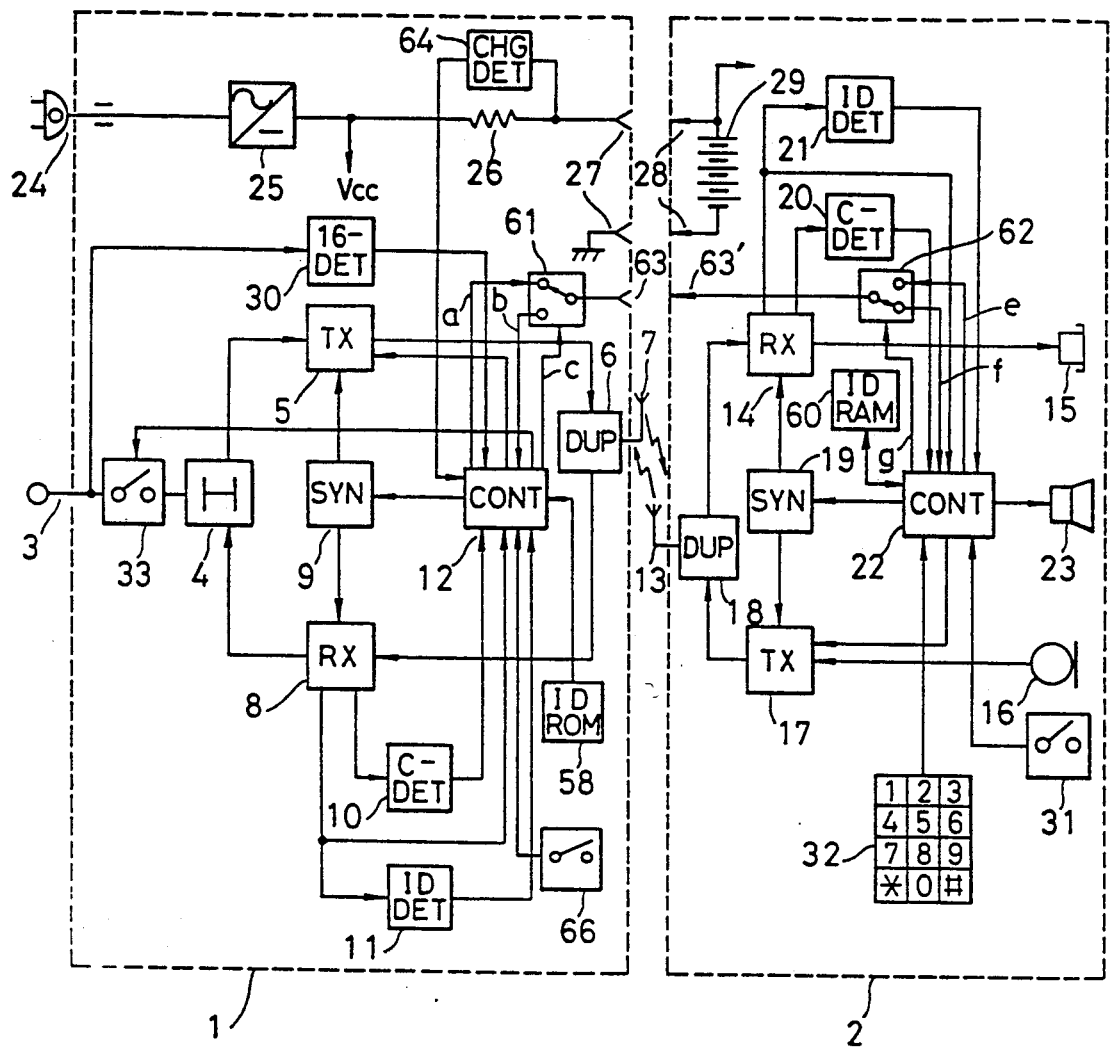

Shown in FIG. 2 is a second embodiment in which a switch 66 for the writing of ID code is provided in the base unit 1. The provision enables the realization of such ID code write operation as mentioned earlier only when the switch 66 is turned ON under such a condition that the radio telephone set 2 is connected to the base unit 1.

With such an arrangement, the write operation can be executed only when it is desired to change the combination between the base unit 1 and the radio telephone set 2 to thereby prevent the unnecessary write operation during the usual operation, thus avoiding the failure of the interconnection therebetween due to the improper write operation.

It is not required to provide the ID code write switch 66 always in the base unit 1, and the switch may be provided in the radio telephone set 2 to transmit writing start information to the base unit similarly to the ID code.

Figure 3:
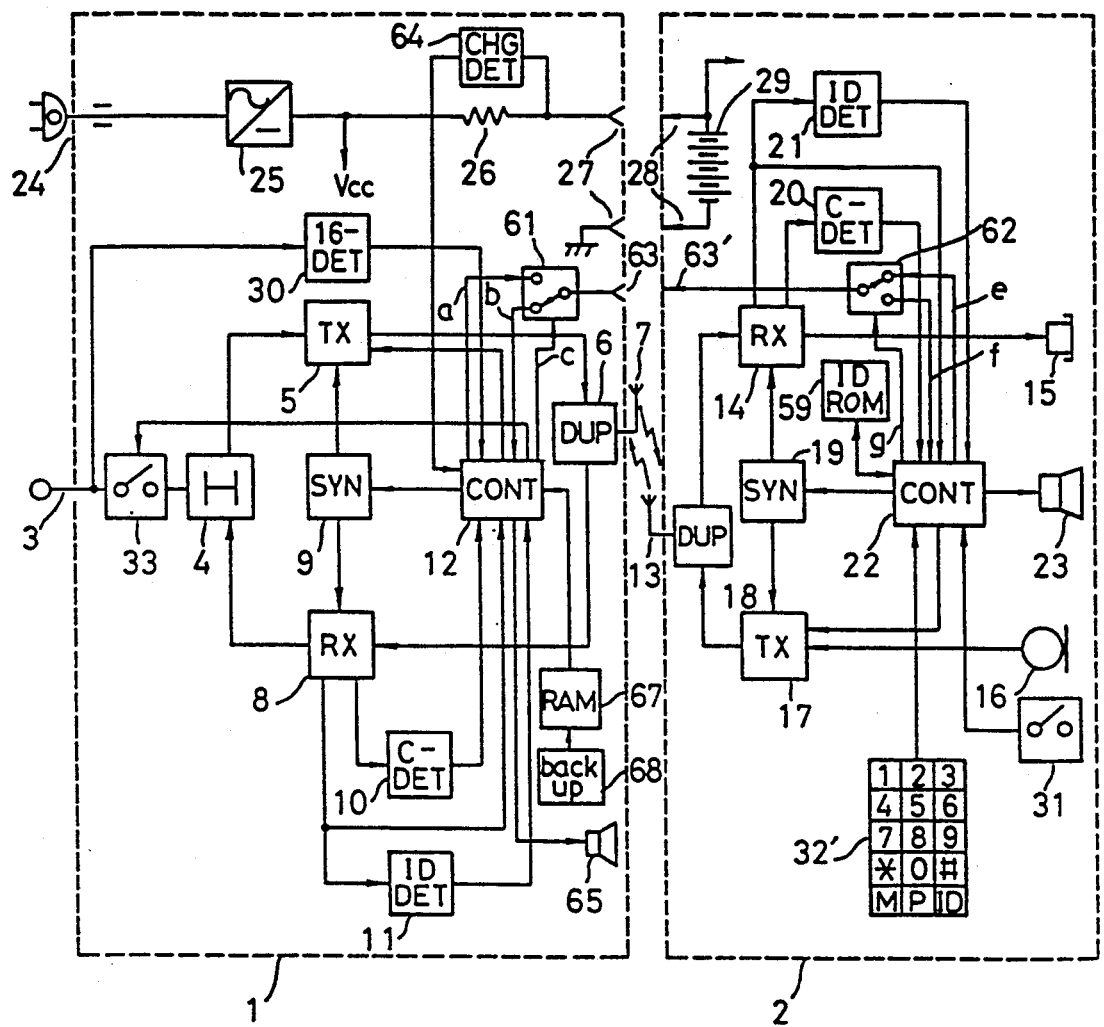

FIG. 3 shows a third embodiment wherein the radio telephone set 2 is provided with a non-volatile ID ROM 59 and a dial key pad 32', the pad having an abbreviated dial key (M) a pause key (P) and an ID code write key (ID).

The setting of the abbreviated dialing function is carried out through the ID code write terminals 63' and 63 or the radio circuit and the abbreviated dial number is stored in a RAM 67 of the base unit 1. The RAM is backed up by a power supply backup circuit 66 (using a capacitor or a dry cell) to prevent the contents of the RAM from being erased even when the AC power source of the base unit 1 is turned OFF.

In this way, a non-volatile ROM is provided in the radio telephone set 2 that is relatively unstable in its power supply to prevent the erasing of the ROM even in case of a power failure, whereas a RAM is provided in the base unit 1 that is relatively stable in its power supply and that involves a less spatial problem even with the addition of the power backup circuit therein, the RAM also being used as an abbreviated dial memory so as to eliminate the need for rewriting the ID code except for modifying the combination of the ID code and the expansion of the system.

Figure 4:
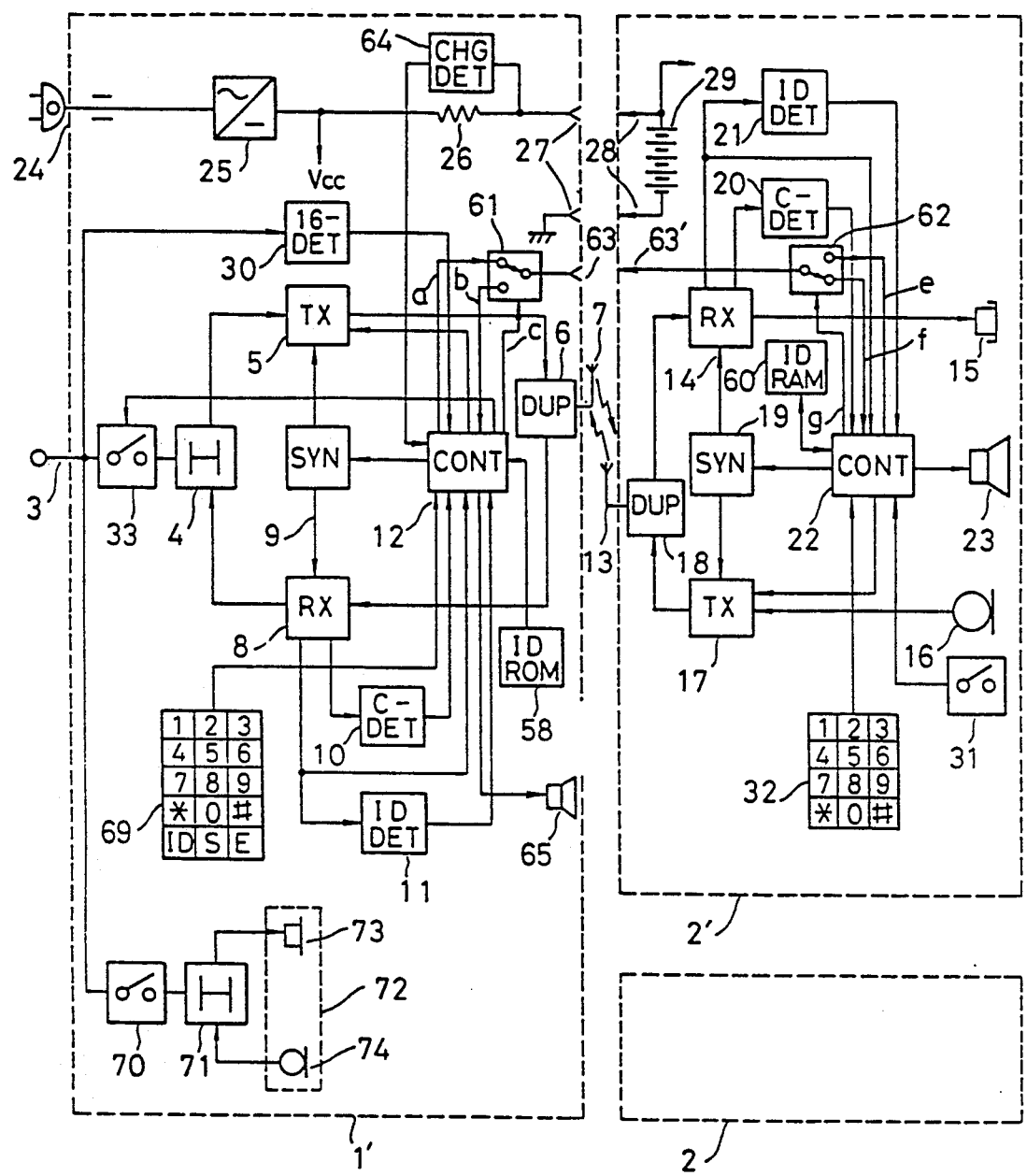

There is shown in FIG. 4 a fourth embodiment of the system which is excellent in the expansion ability or expansibility of the system, and in which a base unit 1' can be coupled with a plurality of radio telephone sets. In the embodiment of FIG. 4, two radio telephone sets 2 and 2' are provided as an example.

Explanation will now be made as to how to expand the system of using only the single radio telephone set 2 by adding the radio telephone set 2' to its.

Assume that the ID code written in the ID ROM 58 of the base unit 1 is "012345". When it is desired to write an ID code in the radio telephone set 2' in the same manner as mentioned earlier, the operator pushes an ID code write key ID provided on a dial key pad 69 and then pushes one number key thereon. In this case, since the radio telephone set 2' corresponds to the second one in the system, when the operator pushes a number key denoted by "2", an ID code "123452" is written in the radio telephone set 2".

That is, the radio telephone set 2 has an ID code of "123451" and thus the two radio telephone sets 2 and 2" have their ID codes which respectively comprise a common ID code part "012345" and different ID code parts "1" and "2" added thereto providing a distinction between the two.

In the illustrated embodiment, even when any of the radio telephone sets 2 and 2' gives a call, they are coupled to the base unit in response to the common ID code part. At the time of receiving a call, either one of the two telephone sets can be sounded by previously selecting one of the two telephones for the ringing tone to be sounded.

Figure 5:
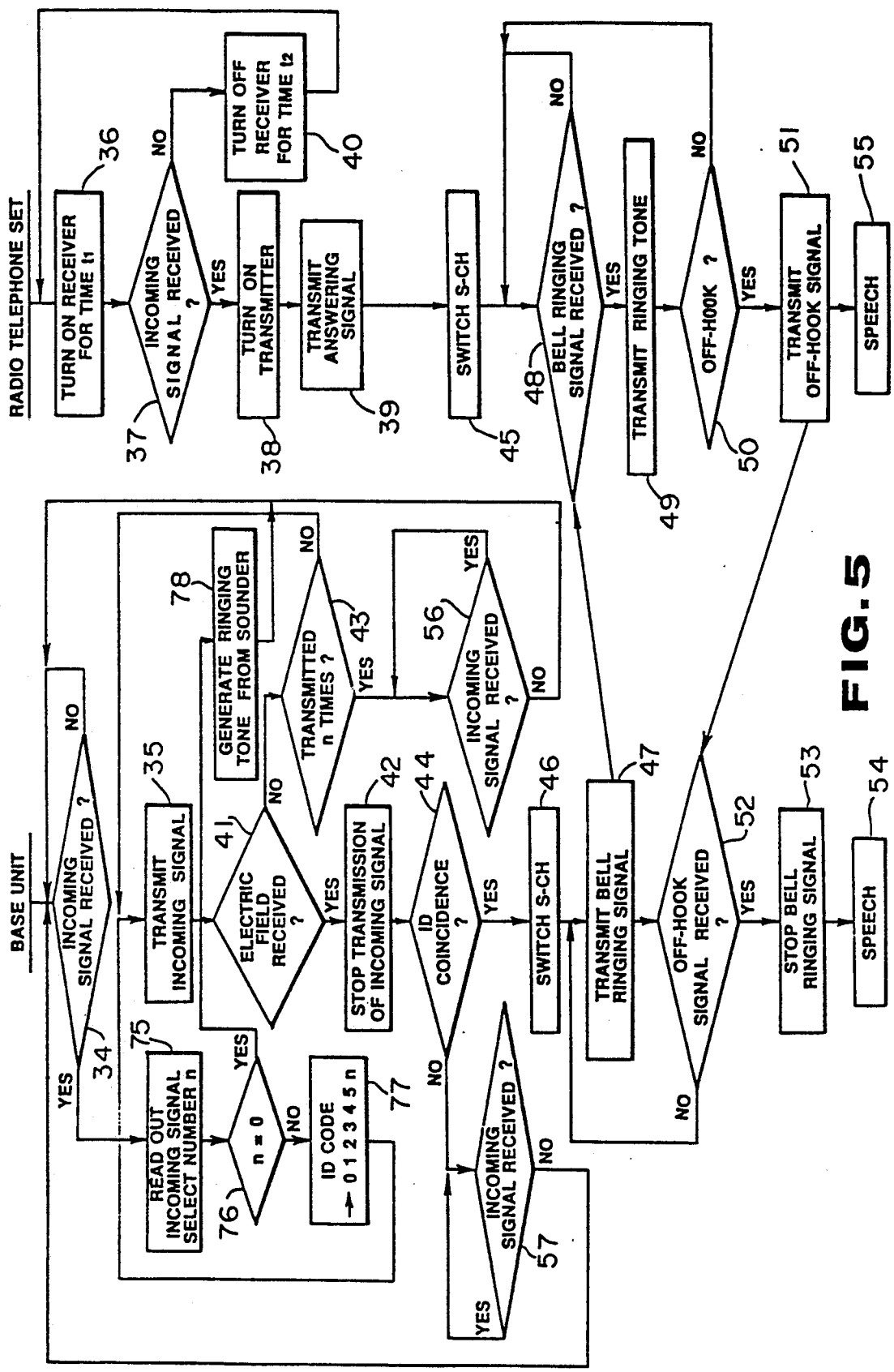
FIGS. 5, 7 and 10 are flowcharts for explaining the operations of FIGS. 4, 6 and 9, respectively.

This control is carried out based on the software of microprocessors which form the cores of the control circuits 12, 22 and 22', as shown by a flowchart in FIG. 5.

When receiving a call (step 34), the base unit 1' reads out a reads out a previously selected received-call select number n from the RAM of the microprocessor (step 75). That is, this number is previously input or stored in the RAM with use of, in the example of FIG. 4, a select key "S" of the dial key pad 69. For example, the pushing of the select key "S" and a number key "1" means $n=1$, that is the radio telephone set 2 is previously selected. In the case of the pushing of the keys "S" and "0", that is $n=0$, the sounder 65 of the base unit 1' is specifically designed to sound (step 76) (step 78). With such an arrangement, the incoming call can be arbitrarily received with use of any of the handset 72 of the base unit 1' and the radio telephone sets 2 and 2'. In other words, under this condition, since the radio function of the base unit 1' is not used, a speech may be realized through the radio circuit established based on the outgoing-call coupling control of the radio telephone set 2 or 2' or through the handset 72. When the operator picks up the handset 72, this causes a hook switch 70 to be turned ON so that the operator can have a conversation with the party with use of a handset transmitter 74 and a handset receiver 73 through a hybrid circuit 71.

In the case of $n=1$ or 2, set the ID code to be "012345n" (step 77). The transmission of the ID code attached to the incoming-call signal enables the selective calling of the radio telephone set 2 or 2'.

Figure 6:
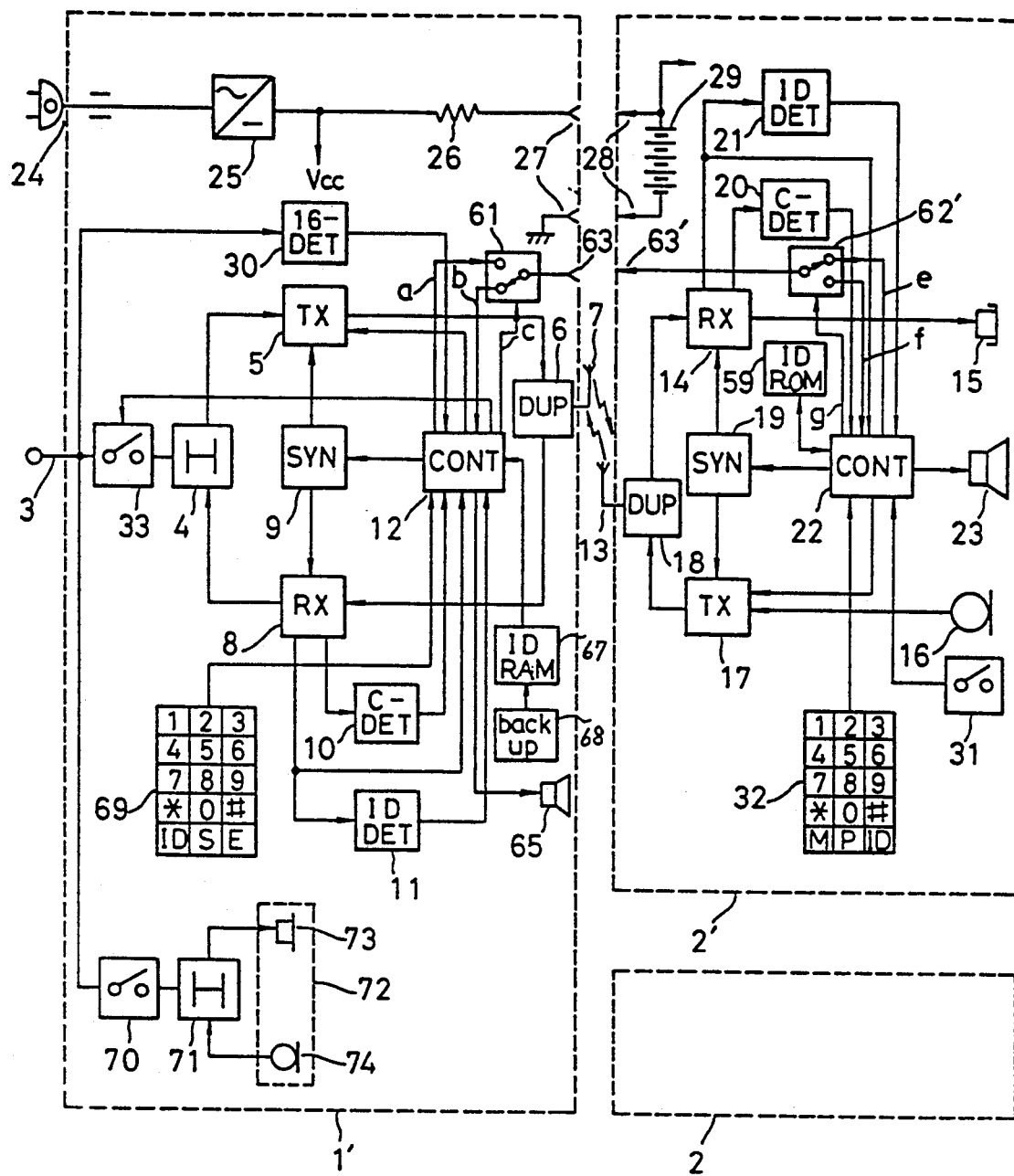

Shown in FIG. 6 is a fifth embodiment, in which case the radio telephone set 2 is provided with a fixed, non-volatile ID ROM 59. The pushing of the ID key causes the ID code to be stored in the RAM 67 through the ID code write terminals 63' and 63 in the same manner as mentioned earlier.

The RAM 67 can store therein a plurality of ID codes identified according to the addresses of the RAM. For example, when it is desired to write the ID code of the radio telephone set 2 at the address 1, the writing is carried out by pushing keys "S" and "1" of a dial key pad 69' in the base unit 1' and then pushing the ID key of the dial key pad 32 in the radio telephone set 2.

Similarly, the ID code of the radio telephone set 2' is also stored, for example, at the address 2 of the RAM 67.

Figure 7:
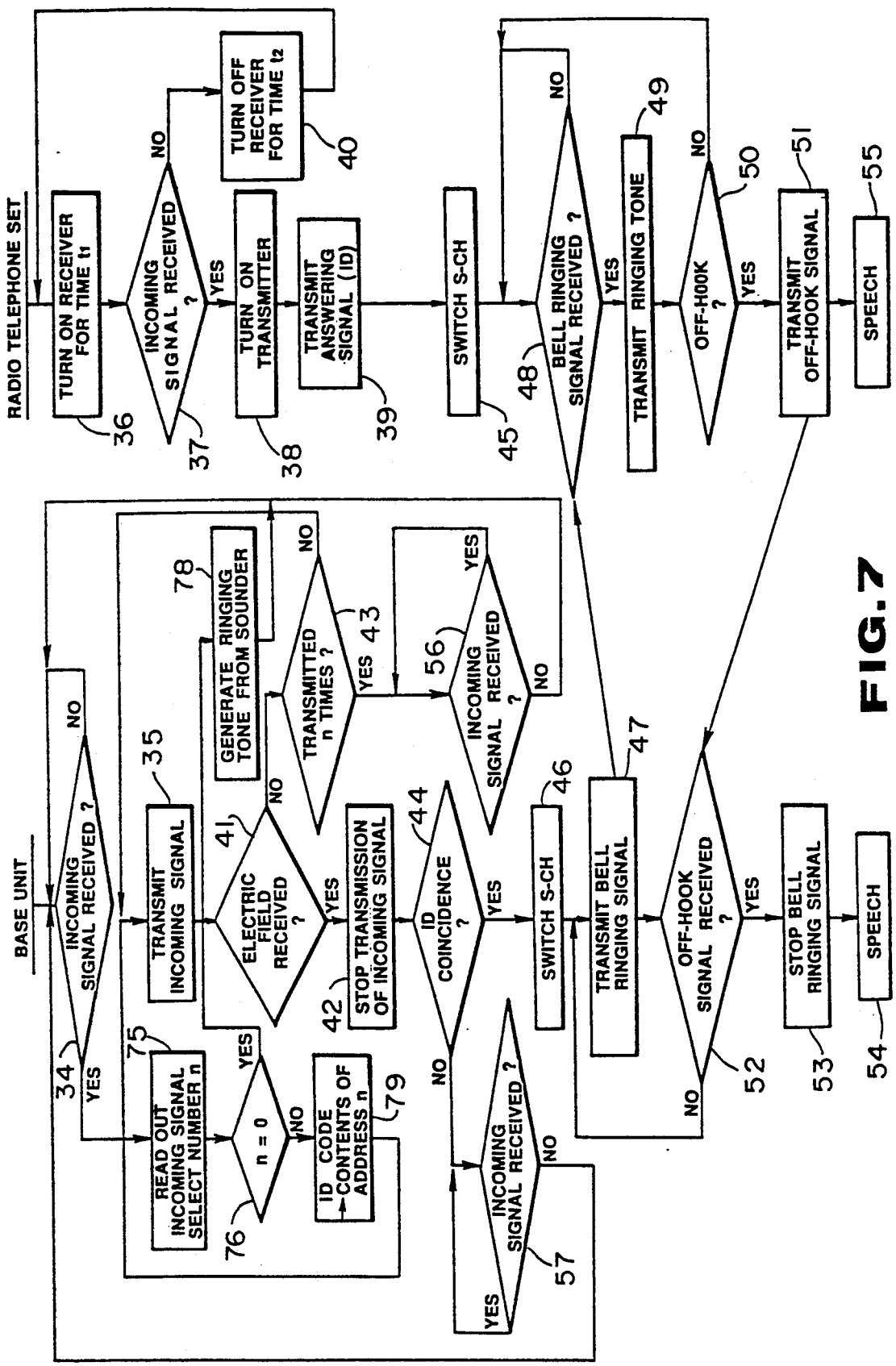

The system after the storage of these telephone ID codes is operated for an incoming call as shown by a flowchart in FIG. 7. That is, as in the case of FIG. 4, the address n of a radio telephone set intended to receive the incoming call is previously registered with use of the select key "S" so that, at the time of receiving the incoming call, the base unit reads out the address n (step 75) and then reads out the ID code at the address n from the RAM 67 (step 79) to perform its operation for the incoming-call.

Figure 8:
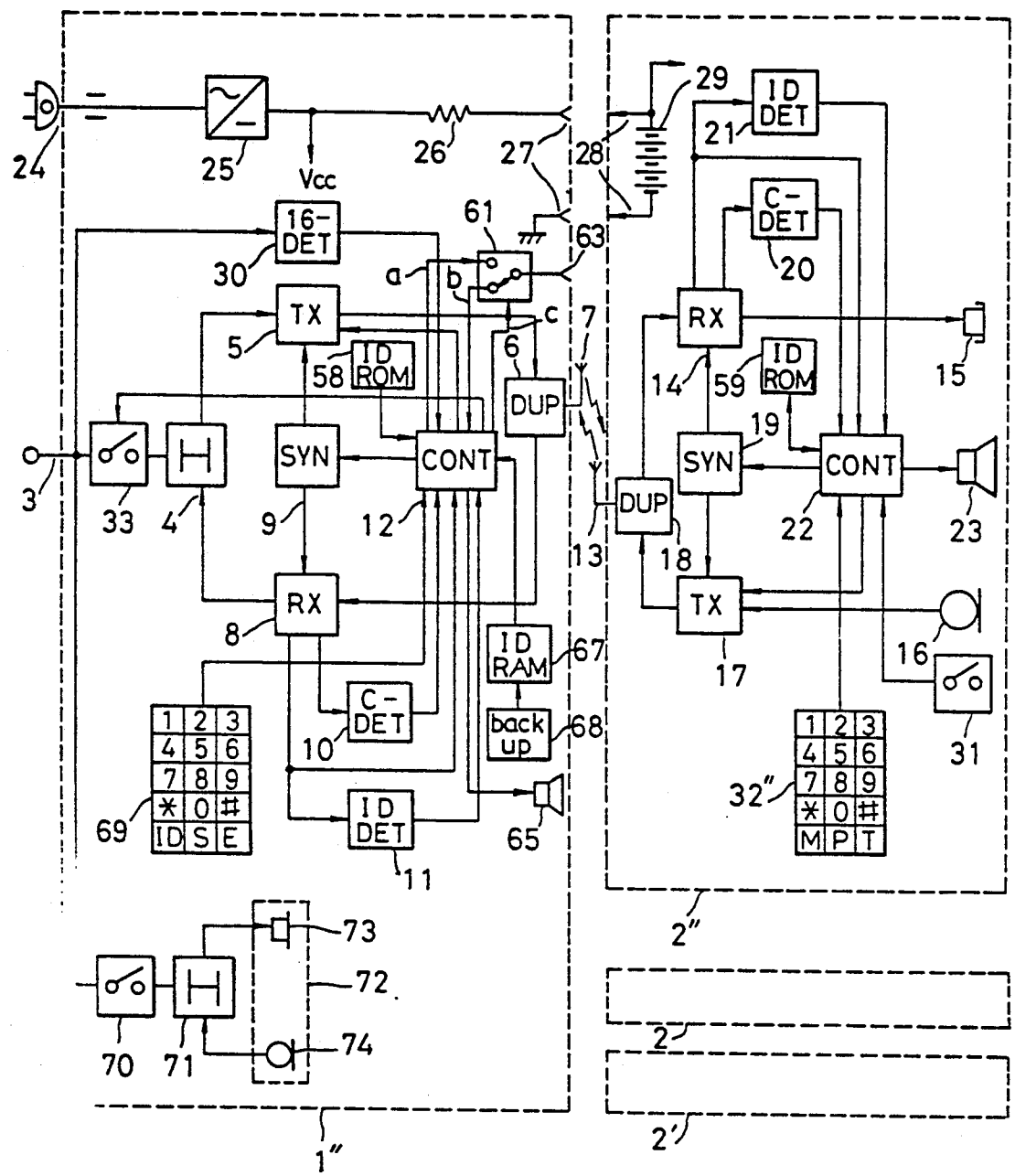

Referring to FIG. 8, there is shown a sixth embodiment in which the radio telephone sets 2 and 2' are the same as those of FIG. 6, a radio telephone set 2" has a fixed, non-volatile ID ROM 59, and a base unit 1" also has an ID ROM 58 and a RAM 67. That is, connection for the receiving-call is effected with respect to the radio telephone set 2". Call emission can be achieved from any of the radio telephone sets 2, 2' and 2", when the ID codes of the radio telephone sets 2 and 2' are previously stored in the RAM 67 similarly to the example of FIG. 6.

In the present embodiment, in the case where an incoming call, which is intended for the user of the radio telephone set 2, is received at the radio telephone set 2", the pushing of the transfer key "T" and a number key indicative of the address (for example, 1) of the radio telephone set 2 by the user of the telephone 2" causes the base unit 1" to once break the radio circuit with the radio telephone set 2" and subsequently to perform its incoming-call coupling control with respect to the radio telephone set 2 with use of the ID code as the contents at the address 1, whereby the incoming call can be received at any of the radio telephone sets. This system is convenient in the case where, for example, there is stationed a person in charge of answering the telephones of the system, and the person may watch only the radio telephone set 2".

The present embodiment can execute its operation for incoming and outgoing calls with good reliability, because the system of the embodiment can be conveniently expanded and at the same time only one pair of ID codes cannot be erased in any case.

Figure 9:
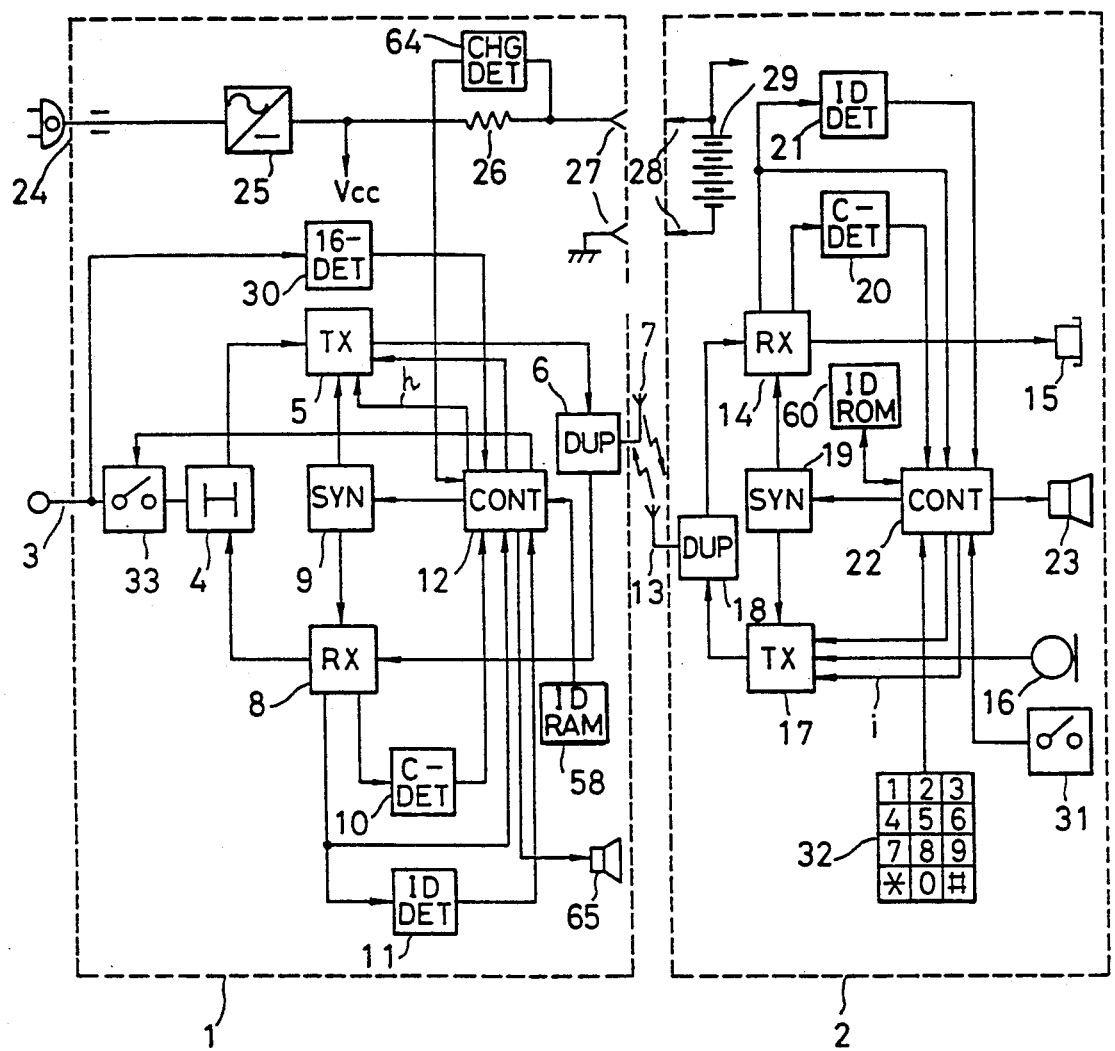

Although the write operation has been executed through the ID code write terminals 63 and 63' in the foregoing embodiments, the present invention is not restricted to the illustrated specific write means. As a matter of course, it is also possible to use the radio circuit as shown in FIG. 9 (showing a seventh embodiment).

The seventh embodiment is different from the first embodiment in that the ID code write terminals 63 and 63' are not provided and control lines h and i are added.

Figure 10:
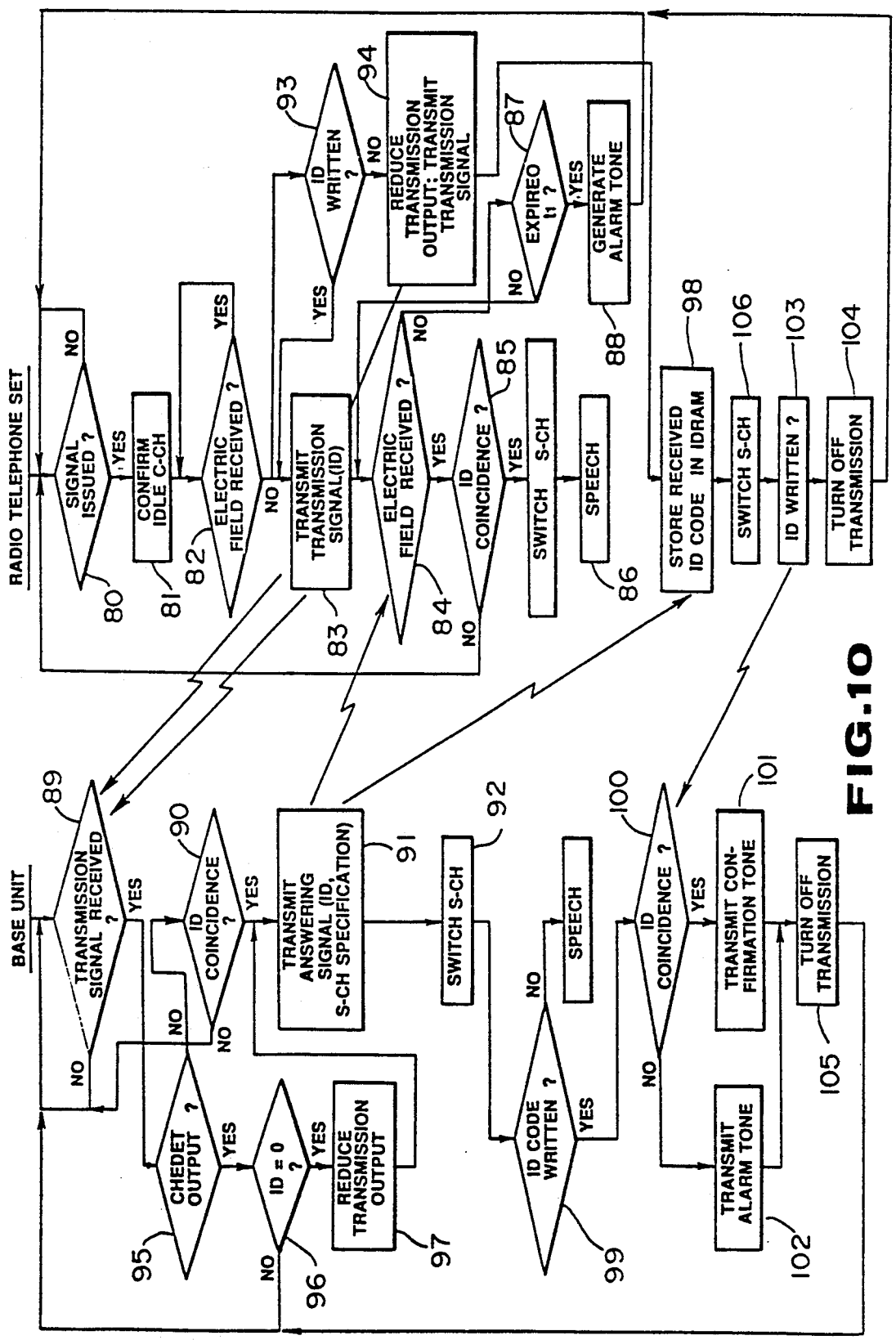
Figure 11:
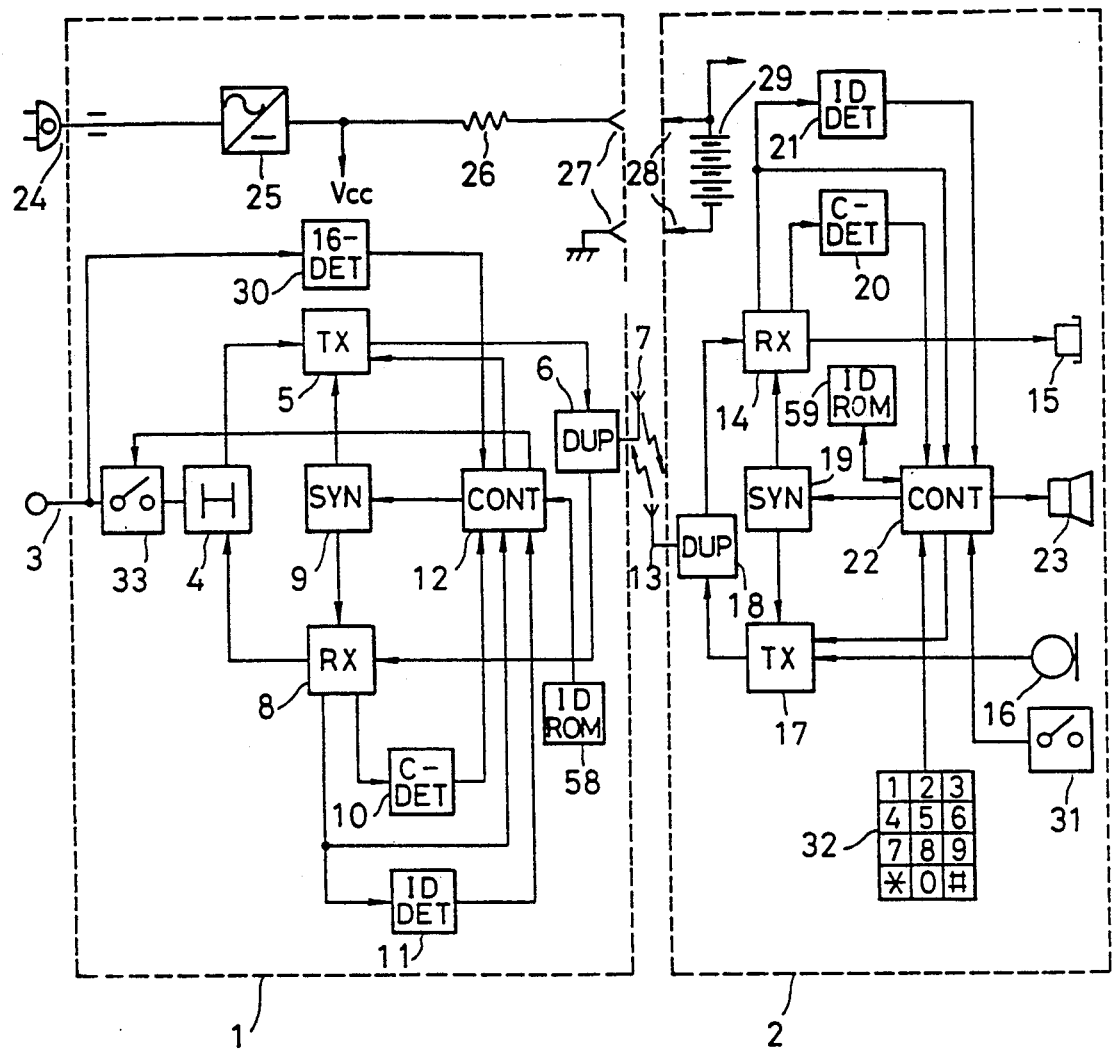
FIG. 11 is a block diagram showing a prior art example.
Figure 12:
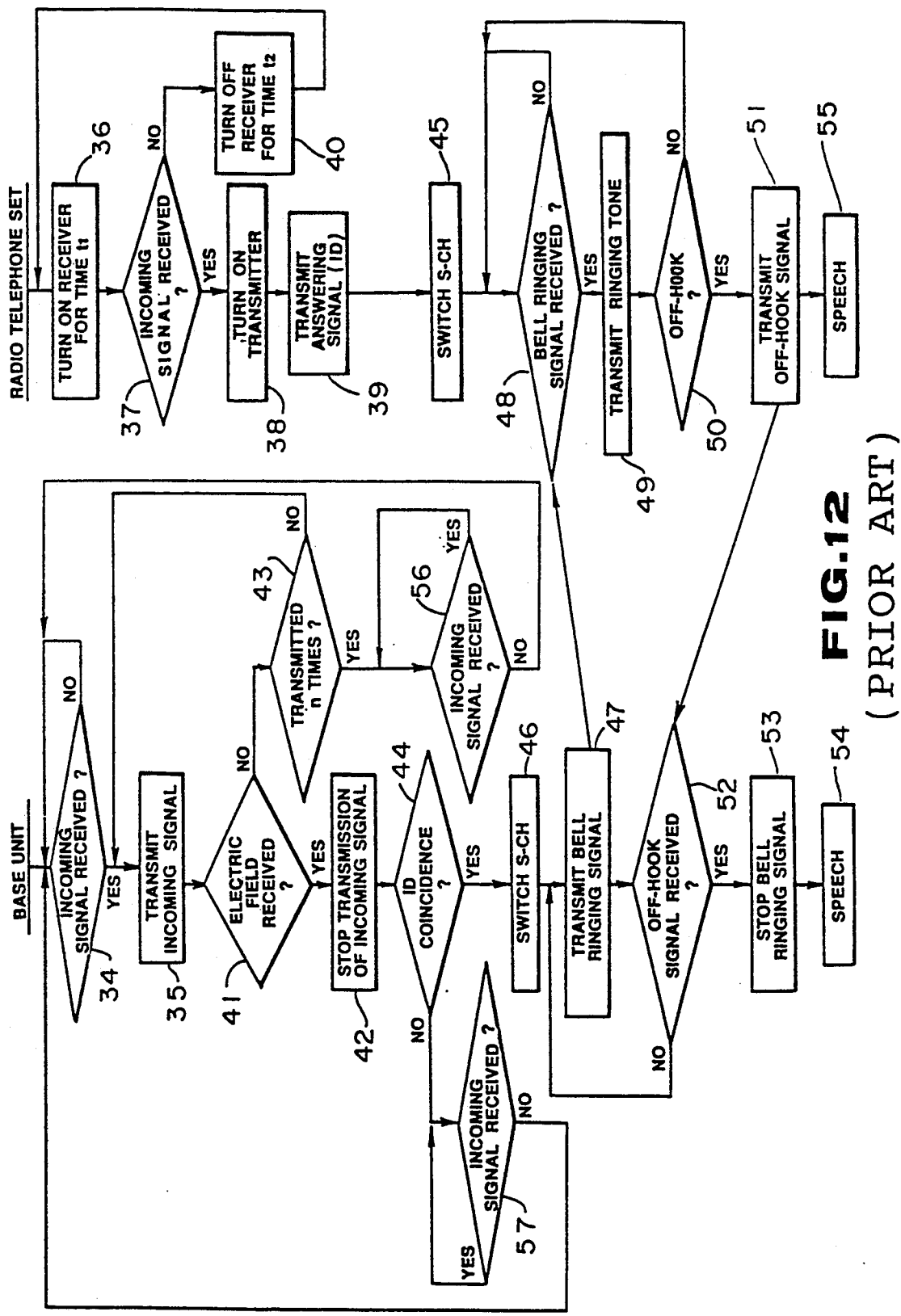
FIG. 12 is a flowchart for explaining the operation of the prior art.

At the initial stage, the system cannot perform its operations for outgoing and incoming calls because no ID codes are written in the ID RAM 60. After the radio telephone set 2 is connected to the base unit 1 and the charging operation detector 64 detects this connected state as already explained earlier, however, the turning ON of the off-hook switch 31 causes the base unit 1 to accept only once the transmission having an ID code no equal to the ID code thereof, establish the radio circuit and write the ID code in the memory. The above operations will be explained by referring to a flowchart of FIG. 10.

Steps 80 to 92 show usual call-emission control. When the radio telephone set 2 issues a call (step 80) and confirms an idle speech C-CH (steps 81 and 82), the telephone set 2 checks whether or not the ID code is already written in the ID RAM 60 (step 93). When the ID code is not written, the telephone set 2 acts to reduce the output of the transmission through the control signal line i and turn ON the transmitter 17 to transmit the ID code "0" as a transmission signal (step 94).

The base unit 1, when receiving the transmission signal from the radio telephone set 2 (step 89), detects the presence or absence of the output of the charging operation detector 64 (step 95). Since the output is present, the base unit 1 judges whether the ID code is "0" or not (step 96). If the ID code is not "0", then the base unit is put again in the await condition because of the presence of interference from other devices, whereas, if the ID code is "0" then the base unit acts to reduce the output of the transmission through the control signal line h and turn ON the transmitter (step 97) to transmit an answering signal (step 91).

The radio telephone set 2, on the other hand, writes the received ID code in the ID RAM 60 in response to the answering signal (step 98), switches the speech channel S-CH to the specified one (step 106), transmits the ID code (step 103), stops the transmission (step 104), and returns to its await mode.

The base unit 1, when confirming that the received ID code coincides with the contents of the ID ROM 58 (step 100) during the write operation of the ID code (step 99), causes the sounder 65 to generate a confirmation tone (such as "pee . . . ") (step 101). In the case of a non-coincidence between the ID codes, the base unit causes the sounder 65 to issue an alarm tone (such as "pee, pee, pee") (step 102), stops the transmission (step 105) and returns to await mode.

In the case of using the radio circuit, the normal transmission output usually increases the possibility of having an interferential effect on other devices. However, since the present embodiment is designed to execute the writing of the ID code only under such a condition that the radio telephone set 2 is connected to the base unit 1, a very low power and very weak radio waves are sufficient to normally operate the present embodiment, thus reducing the increase of the interference possibility.

In the present embodiment, further, since the write operation is restricted to only once, it is preferably to provide a timber or add the control operation. Furthermore, how to control the system, how to use the radio channel and so on may be arbitrarily modified so long as they do not depart from the scope of the subject matter of the present invention.

For example, the invention may be arranged so that, instead of turning ON the off-hook switch with the base unit connected to the radio telephone set, the turning ON of the off-hook switch and then the connecting of the radio telephone set to the base unit in a predetermined time (for example, 3 seconds) will enable the realization of the write operation of the ID code, or so that the execution of such operation even without the unit-telephone interconnection will enable the realization of the write operation of the ID code.

In the case where it is unfavorable that anyone can arbitrarily perform the write operation of the ID code, the invention is arranged so that the ID code write operation can be attained, for example, only when the operator previously inputs a secret number through the dial key pad 69' to previously store it in the RAM 67 and at the time of writing the ID code, only when he or she inputs the secret number that coincides with the one previously stored in the RAM 67.

The present invention is not limited to the foregoing embodiments but may be arbitrarily modified in the scope of the subject matter of the invention.

For example, in the case where only once write operation is required, it is suffice to use a one-time PROM or it is possible to use an electrically re-writable, non-volatile ROM called $E^2$ PROM, in place of the part explained above as the ID RAM. In addition, the ID code alone is not used, but some signal may also be added to the ID code or it may be possible to write some signal in a part of the ID code may be written according to the present invention.

INDUSTRIAL APPLICABILITY

As has been disclosed in the foregoing, in accordance with the present invention, the arbitrary modification of the combination between a base unit and a radio telephone set as well as the additional installation of another base unit or radio telephone set can advantageously realized highly easily and reliably.

Since the present invention allows the arbitrary modification of the unit-telephone combination, not only the unit and telephone in the combination can be readily exchanged for a new one. As a result, the system of the present invention is good in maintenance and high in manufacturing flexibility because of the arbitrary combination.

I claim:

1. A radio telephone system, comprising:
a base unit connected to a telephone line;

a radio telephone set comprising means for coupling said radio telephone set through a radio link to said base unit;
first nonvolatile memory means disposed in said base unit and having an identification code previously written therein;
second memory means disposed in said radio telephone set to be optionally written therein;
means for electrically connecting said base unit to said radio telephone set;
means for detecting completion of an electrical connection between said base unit and said radio telephone set;
means for writing in said second memory means said identification code previously written in said first memory means through the radio link;
means for starting a writing operation of said writing means in response to a detection output of said detecting means; and
a transmitter in said base unit and means for reducing an output power of said transmitter to a level below a predetermined value when said identification code of said first memory means is written in said second memory means through the radio link.

2. A radio telephone system, comprising:
a base unit connected to a telephone line;
a radio telephone set comprising means for coupling said radio telephone set through a radio link to said base unit;
first memory means disposed in said base unit to be optionally written therein;
second nonvolatile memory means disposed in said radio telephone set and having an identification code previously written therein;
means for writing in said first memory means said identification code previously written in said second nonvolatile memory means, said writing means including
  means for electrically connecting said base unit to said radio telephone set,
  means for producing a detecting output upon completion of an electrical connection between said base unit and said radio telephone set, and
  manual input means operable in response to the presence of said detection output to start writing in said first memory means said identification code previously written in said second nonvolatile memory means; and
a transmitter in said base unit and means for reducing an output power of said transmitter to a level below a predetermined value when said identification code of said first memory means is written in said second memory means through the radio link.

* * * * *

UNITED STATES PATENT AND TRADEMARK OFFICE
CERTIFICATE OF CORRECTION

PATENT NO.  :   5,097,500
DATED       :   March 17, 1992
INVENTOR(S) :   Koichi Ito It is certified that error appears in the above-identified patent and that said Letters Patent is hereby corrected as shown below:

Title page, item (75):Inventor, change "Koichi Itoh" to
   --Koichi Ito--.

Signed and Sealed this

Ninth Day of November, 1993

Attest:

BRUCE LEHMAN

*Attesting Officer*         Commissioner of Patents and Trademarks